US009426603B2

(12) United States Patent
Nanni

(10) Patent No.: US 9,426,603 B2
(45) Date of Patent: Aug. 23, 2016

(54) SYSTEM AND METHOD FOR USING A DEVICE TO OPERATE ON MULTIPLE NETWORKS

(71) Applicant: Silicon Laboratories Inc., Austin, TX (US)

(72) Inventor: Maurizio Nanni, Cambridge, MA (US)

(73) Assignee: Silicon Laboratories Inc., Austin, TX (US)

( * ) Notice: Subject to any disclaimer, the term of this patent is extended or adjusted under 35 U.S.C. 154(b) by 330 days.

(21) Appl. No.: 13/799,914

(22) Filed: Mar. 13, 2013

(65) Prior Publication Data

US 2014/0269406 A1    Sep. 18, 2014

(51) Int. Cl.
*H04L 12/28*    (2006.01)
*H04W 4/00*    (2009.01)

(52) U.S. Cl.
CPC ........... *H04W 4/008* (2013.01); *H04L 12/2803* (2013.01); *H04L 12/2838* (2013.01); *H04W 4/006* (2013.01)

(58) Field of Classification Search
CPC ............ H04L 12/2836; H04L 12/2838; H04L 12/282; H04L 12/2827; H04L 12/2834; H04L 12/2803; H02J 2003/143; H04W 4/008; H04W 4/006
USPC .................. 370/254, 329, 338, 401; 713/150; 717/171; 700/291
See application file for complete search history.

(56) References Cited

U.S. PATENT DOCUMENTS

| | | | |
|---|---|---|---|
| 2010/0217450 A1* | 8/2010 | Beal et al. ..................... | 700/291 |
| 2011/0047370 A1* | 2/2011 | Nagel et al. ................... | 713/150 |
| 2011/0202910 A1* | 8/2011 | Venkatakrishnan et al. .. | 717/171 |
| 2012/0063397 A1* | 3/2012 | Abedi et al. .................. | 370/329 |

OTHER PUBLICATIONS

Shahin Farahani, ZigBee Wireless Networks and Transceivers, 2008, Elsevier.*
Design with new 802.15.4 solutions for Kinetis MCU, Freescale, 2012.*

* cited by examiner

*Primary Examiner* — Anh Ngoc Nguyen
*Assistant Examiner* — Harun Chowdhury
(74) *Attorney, Agent, or Firm* — Nields, Lemack & Frame, LLC

(57) ABSTRACT

A system and method whereby a device may operate on two IEEE802.15.4 networks is disclosed. In one embodiment, the multi-network device comprises exactly one radio portion, a processing unit and a computer readable medium, in communication with the processing unit The computer read medium comprises instructions which, when executed, allow the device to share the radio portion among a plurality of IEEE802.15.4 networks. In a further embodiment, the multi-network device acts as a sleepy end device on one of the IEEE802.15.4 networks in which it participates. In another embodiment, it may operate as a coordinator node on one of the plurality of IEEE802.15.4 networks.

16 Claims, 4 Drawing Sheets

SYSTEM AND METHOD FOR USING A DEVICE TO OPERATE ON MULTIPLE NETWORKS

BACKGROUND

A IEEE802.15.4 network, such as a ZigBee® network, can be created to allow a utility corporation to determine usage for each building or residence in its domain, without requiring manual reading of utility meters as is typically done. These types of network is one of the standards defined by the Zig-Bee® alliance, and are often referred to a Smart Energy (SE) network. A different IEEE802.15.4 network, such as a second ZigBee® network, may be created to implement a home automation or home management system and may be responsible for monitoring utility consumption, such as electricity, fuel and water usage. This type of network is often referred to as a Home Automation (HA) network. In more complex environments, it may be beneficial to allow these two networks to exchange information. For example, the HA network may use information regarding current pricing of a particular utility to moderate the consumption of that utility. However, because of how the different standards have been defined, SE networks and HA networks are incompatible with one another. This incompatibility also exists between other types of Zig-Bee® networks as well.

Therefore, in order to use information from an SE network with a HA network, special adaptations may be required. One common technique is to design a module, which has two ZigBee® network devices, as shown in FIG. 1. One network device 20 is configured to operate on an SE network, while a second network device 30 is configured to operate on an HA network. A controller 10 is used to obtain information from one network and supply that information to the second network. The controller 10 may move data from the SE network to the HA network, or from the HA network to the SE network. This configuration is further complicated if interaction between more than two ZigBee® networks is desired.

While the configuration shown in FIG. 1 is operational, it is cumbersome, costly and complex. Therefore, it would be beneficial if there were a system and method to utilize a single network device on two different 802.15.4 networks.

SUMMARY

A system and method whereby a single device may operate on two IEEE802.15.4 networks is disclosed. In one embodiment, the multi-network device comprises exactly one radio portion, a processing unit and a computer readable medium, in communication with the processing unit, comprising instructions which, when executed, allow the device to share the radio portion among a plurality of IEEE802.15.4 networks. In a further embodiment, the multi-network device acts as a sleepy end device on one of the IEEE802.15.4 networks in which it participates. In another embodiment, it may operate as a coordinator node on one of the plurality of IEEE802.15.4 networks.

In another embodiment, a method of using a device to operate on two different IEEE802.15.4 networks is disclosed. The method comprises configuring a radio portion of the device to operate on a first IEEE802.15.4 network; polling a parent node of the first IEEE802.15.4 network; retrieving a communication from the parent node if a communication is determined to be available based on the polling; and reconfiguring the radio portion of the device to operate on a second IEEE802.15.4 network after the polling and retrieving steps.

In another embodiment, a computer readable medium is disclosed. The computer readable medium comprises instructions allowing a device, having a radio portion, to operate as a parent node on a ZigBee® HA network and as a sleepy end device on a ZigBee® SE network, wherein, the instructions, when executed: configure the radio portion of the device to operate on the ZigBee® SE network; poll a parent node of the ZigBee® SE network; retrieve a communication from the parent node if a communication is determined to be available based on the polling; and reconfigure the radio portion of the device to operate as a parent node on the ZigBee® HA network after the polling and retrieving steps.

In one embodiment, the device comprises exactly one radio portion; a processing unit; and a memory device in communication with the processing unit, comprising instructions which, when executed, allow the device to share the radio portion among a plurality of IEEE802.15.4 networks. In a further embodiment, the instructions comprise a routine which, when executed, allows the device to operate as a sleepy end device on a first of the plurality of IEEE802.15.4 networks.

BRIEF DESCRIPTION OF THE FIGURES

For a better understanding of the present disclosure, reference is made to the accompanying drawings, which are incorporated herein by reference and in which.

DETAILED DESCRIPTION

As described above, IEEE standard 802.15.4 defines the lower network layers for wireless personal networks. Therefore, although the disclosure describes ZigBee® networks and devices, the disclosure is not limited to this particular protocol. In fact, the present system and methods can be utilized with any IEEE 802.15.4 network. The term "IEEE802.15.4 network" is used to denote any network, including ZigBee®, that utilizes the IEEE standard 802.15.4.

The IEEE802.15.4 standard has defined a variety of device types. Specifically, there are several different device classes, which are defined as Coordinator Device, Router Device, End Device, or Sleepy End Device.

Figure 1:
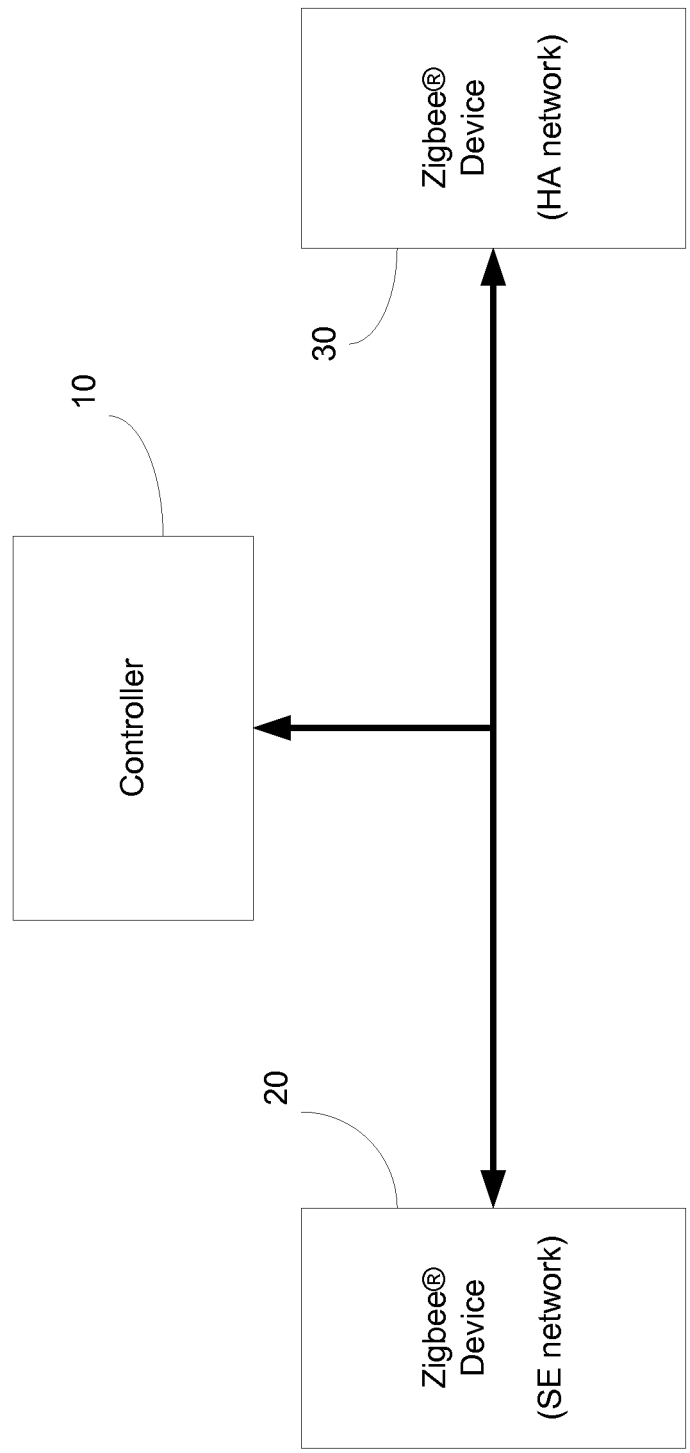
FIG. 1 represents a module of the prior art.
Figure 2:
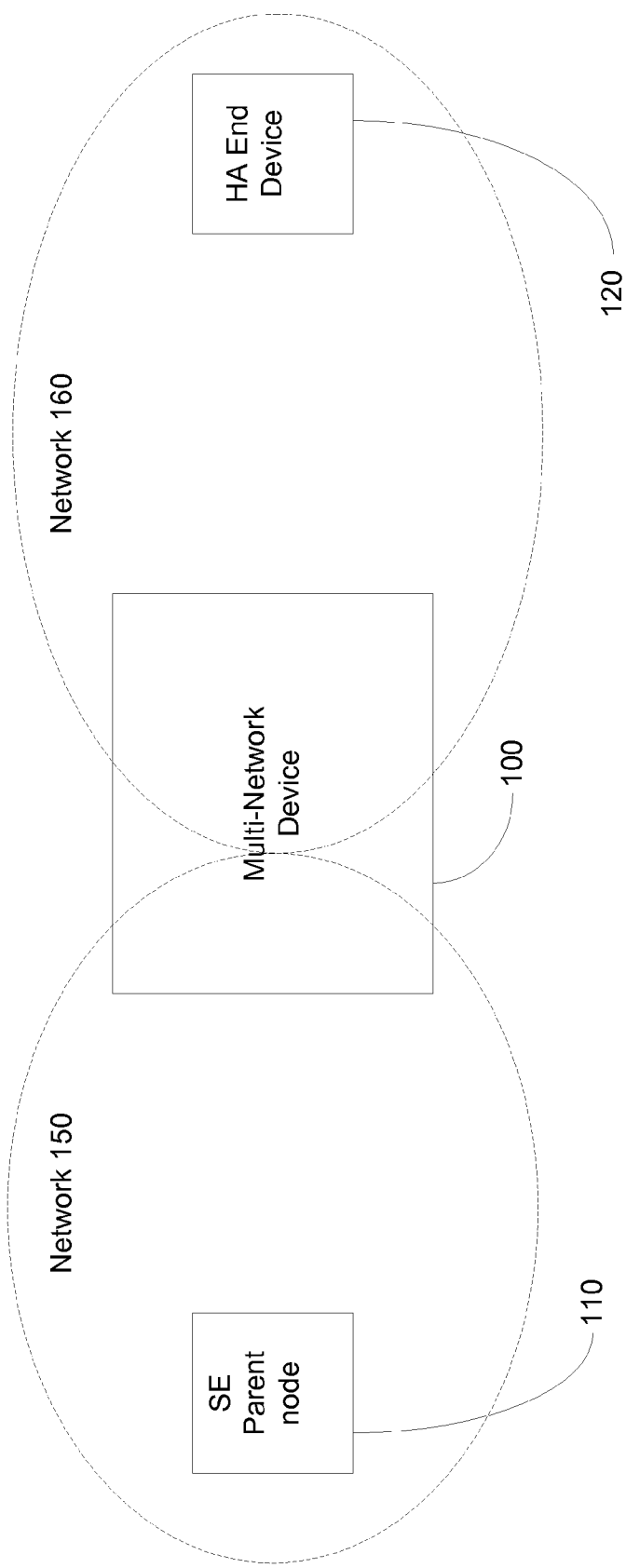
FIG. 2 represents a single device operating concurrently on two different IEEE802.15.4 networks according to an exemplary embodiment.
Figure 4:
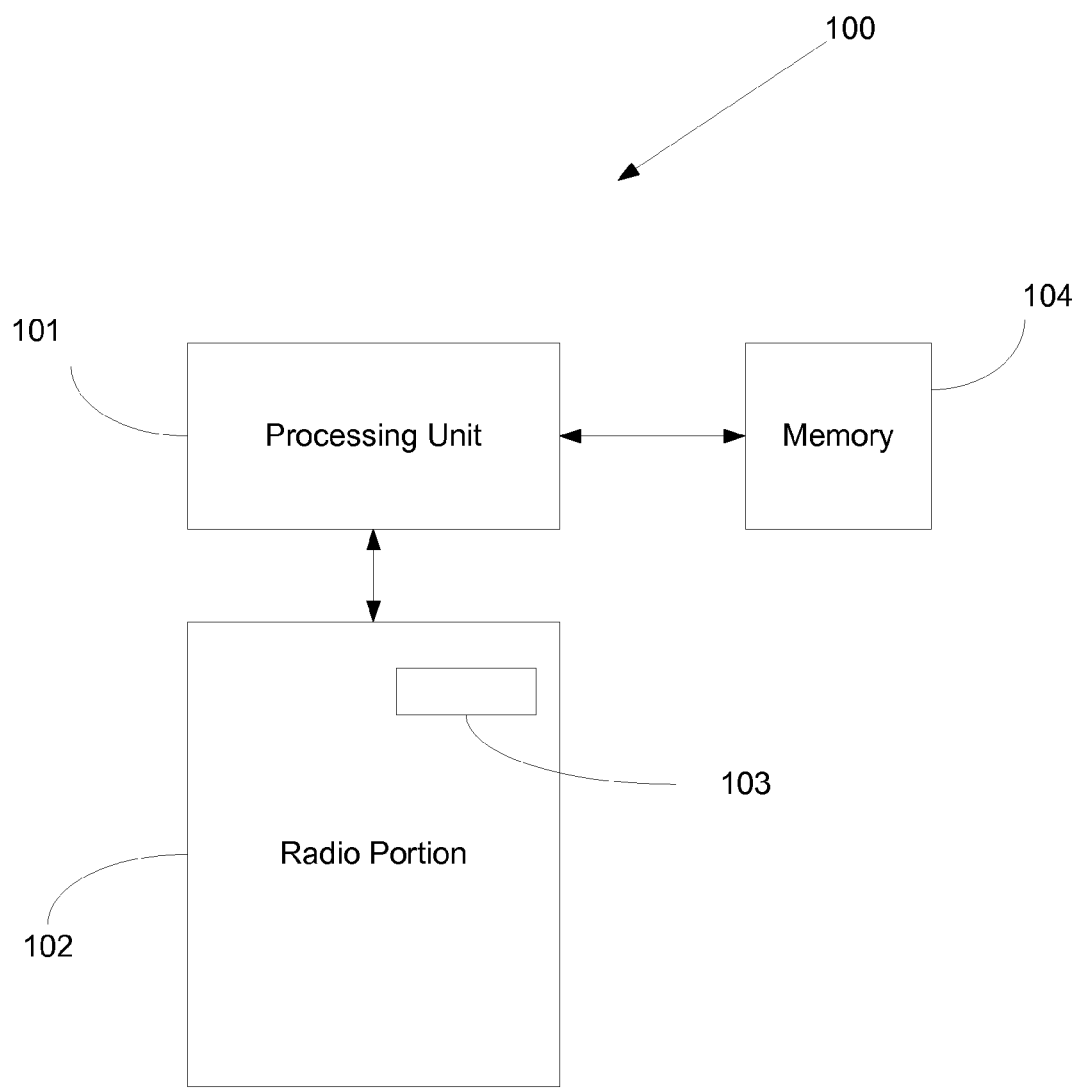
FIG. 4 is a representative schematic of the multi-network device of FIG. 2.

FIG. 2 shows a configuration of a single multi-network device 100 being part of two different networks 150, 160. As shown in more detail in FIG. 4, the multi-network device 100 includes a processing unit 101, and a memory device 104 in communication with the processing unit 101. The memory device 104 comprises instructions, which, when executed by the processing unit 101, enable the multi-network device 100 to perform the functions described herein. While a memory device 104 is disclosed, any computer readable medium may be employed to store these instructions. For example, read only semiconductor device (ROM), a random access memory (RAM), a magnetic storage device, such as a hard disk drive, or an optical storage device, such as a CD or DVD, may be employed. Furthermore, these instructions may be downloaded into the memory 104, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 101, as shown in FIG. 4. The second computer readable media may be a CDROM, or a different memory device, which is located remote from the multi-network device 100. The instructions contained on this second computer readable media may be downloaded onto the memory or other computer readable media 104 to allow execution of the instructions by the processing unit 101.

The multi-network device 100 also includes a radio portion 102. This radio portion 102 includes the antenna, the radio circuit, the lower level protocol interfaces and processors, and one or more configuration registers 103 that allow the radio portion 102 to be configured to operate on a particular network. By modifying the configuration registers 103, the radio portion 102 can be made to operate on a plurality of networks, operating on one of these networks at a time.

Returning to FIG. 2, in one embodiment, the network 150 is a ZigBee® SE network, while network 160 is a ZigBee® HA network. However, the disclosure is not limited to this embodiment. The two networks may be any type of network described in the ZigBee® specification. Furthermore, the disclosure is not limited to two networks. In fact, the multi-network device 100 may participate in three or more networks. In this embodiment, a parent node 110, which may be a Coordinator device or a Router device, already exists in network 150. In this scenario, the multi-network device 100 may operate as a sleepy end device. In network 160, the multi-network device 100 may also be a sleepy end device. However, in other embodiments, the multi-network device 100 may be a coordinator device, a router device or an end device. For example, in FIG. 2, the multi-network device 100 serves as the coordinator device for network 160 and end device 120.

Table 1 shows the various configurations that can be embodied in the present device.

TABLE 1

| Network 150 | Network 160 |
|---|---|
| Sleepy end device | Sleepy end device |
| Sleepy end device | End device (always on) |
| Sleepy end device | Router device(always on) |
| Sleepy end device | Coordinator device(always on) |

If the multi-network device 100 is part of more than two networks, it should be a sleepy end device on at least all but one of those networks. In other words, if the multi-network device 100 is part of N networks, it is a sleepy end device on at least N−1 of these networks.

Since the multi-network device 100 only has a single radio portion 102, its participation in multiple networks can be achieved by timesharing the radio portion 102 of the multi-network device 100. This is made possible due to the mechanism defined in the IEEE802.15.4 standard regarding sleepy end devices. As stated above, sleepy end devices are allowed to enter a low power state for extended periods of time. Because of this, the IEEE802.15.4 standard has defined a mechanism whereby the parent node (which may be a Coordinator device or a Router device) does not attempt to communicate with the sleepy end device, but rather it simply stores any communications for that device in a queue, referred to as an indirect queue. The sleepy end device polls the parent node at a later time to retrieve the communication from the indirect queue. Thus, the sleepy end device does not need to be active when a communication from the parent node becomes available.

While this mechanism was intended to allow for very low power end devices, it can also be utilized in embodiments of the present invention. Specifically, when the radio portion 102 of multi-network device 100 is tuned to the network 160, the parent node 110 of network 150 may store a communication in its indirect queue, which the multi-network device 100 can retrieve at a later time. In other words, parent node 110 is unaware that multi-network device 100 was actually operating on a different network when it stored the communication destined for the multi-network device 100 in its indirect queue.

At a later time, when the radio portion 102 of multi-network device 100 is tuned to the network 150, the multi-network device 100 may poll the parent node 110 to determine if there are any outstanding communications destined for it. If so, the multi-network device 100 then requests delivery of the communication, in the same way as would occur if the multi-network device 100 had been in a sleep mode.

In one embodiment, as shown in FIG. 2, the multi-network device 100 is a sleepy end device on network 150 and may be a coordinator device on network 160. Alternatively, it may be a router device. Therefore, in embodiments where multi-network device 100 is referred to as a coordinator device on network 160, it is understood that this device may be a parent node, operating as either a coordinator device or a router device. In this configuration, multi-network device 100 appears to be always on, as viewed by the other devices 120 in network 160. This can be achieved in a number of ways.

In one embodiment, the multi-network device 100 is configured to be part of network 160 by default. To do this, all of the radio and network parameters, such as those in configuration registers 103, are set in the multi-network device 100 so that the radio portion 102 is able to communicate on network 160.

Figure 3:
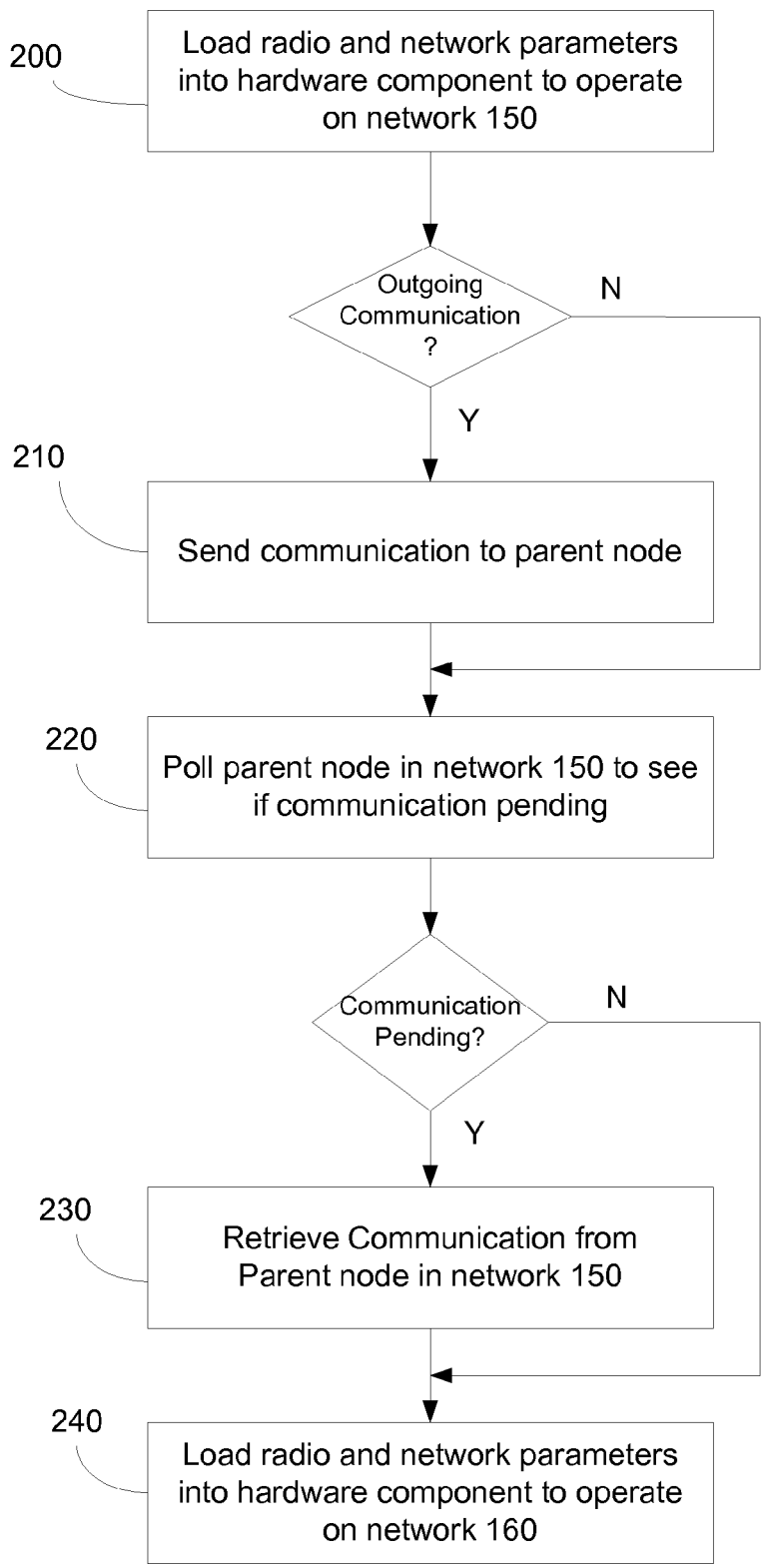
FIG. 3 represents a flowchart which may be executed by the multi-network device of FIG. 2 according to one embodiment.

A timer may be used to indicate that the multi-network device 100 should poll the parent node 110 of network 150. This timer may be used to generate an interrupt in one embodiment. The multi-network device 100 then executes a set of steps in response to the expiration of the timer. FIG. 3 shows one sequence of steps that may be executed by the multi-network device 100 to poll for incoming communications.

First, the multi-network device 100 switches all of the radio and network parameters to those used to operate on network 150, as shown in step 200. This may include changing the values of configuration registers 103. In some situations, the multi-network device 100 may have previously retrieved a communication from the parent node 110 that requires a response. In this scenario, the multi-network device 100 will transmit the response to that communication to the parent node 110 as shown in step 210. If the multi-network device 100 does not have data to return to the parent node 110, the sequence moves directly to step 220.

It then polls parent node 110 to determine if there is any communications destined for it that have been stored in its indirect queue, as shown in step 220. If not, the multi-network device 100 switches the radio and network parameters back to the default state, as shown in step 240. If a communication is available, the multi-network device retrieves the communication, in step 230, before switching back to the default settings.

In addition, the IEEE802.15.4 defines a mechanism whereby the parent node informs the sleepy end node that it has more data to transmit. There is a bit, referred to as the frame pending bit which is transmitted with the communication in step 230. If this bit is set, it indicates that the parent node has additional data to transmit to the multi-network device 100. If this bit is not set, no additional data is available for the sleepy end device.

According to typical protocol, if the frame pending bit is set, the sleepy end device would automatically repeat step 230 until the frame pending bit in the outgoing communication is no longer set.

However, if the multi-network device 100 is acting as a parent node, for example, as a coordinator device, on one network, such as network 160, it may be beneficial that the time consumed executing the sequence of FIG. 3 is kept small. In one embodiment, tests have shown that switching the radio from one network to another, as is done in steps 200 and 240 consumes about 420 microseconds. Other measured execution times are shown in Table 2 below:

TABLE 2

| Event Sequence | Executed Steps | Execution Time |
|---|---|---|
| Poll parent node, No outgoing communication found | 200, 220, 240 | 2.26 ms |
| Poll parent node, Outgoing communication found and retrieved | 200, 220, 230, 240 | 8.02 ms |
| Deliver data to parent node, poll parent node, no outgoing communications found | 200, 210, 220, 240 | 8.82 ms |
| Deliver data to parent node, poll parent node, communication found and retrieved | 200, 210, 220, 230, 240 | 14.52 ms |

The flowchart shown in FIG. 3 may be executed when the multi-network device 100 is operating as a coordinator device or a router device in network 160, as this flowchart is intended to minimize the time consumed operating on the other network 150.

Note that the routine of FIG. 3 does not allow step 230 to be repeated if the frame pending bit is set. This is to minimize the execution time and insure some consistency in execution time. However, in one embodiment, step 230 is repeated if the frame pending bit is set. In another embodiment, the multi-network device 100, recognizing that more data is intended for it, adjusts the timer described above, so that this routine is executed sooner than it would otherwise be executed.

For example, if the timer was set to 5 seconds, the routine of FIG. 3 would be executed every 5 seconds by the multi-network device 100. However, if the multi-network device 100 observed that the frame pending bit was set, the timer may be adjusted to a smaller value, such as 0.1 seconds. Once the frame pending bit is not longer set during a communication received in step 230, the timer is returned to its default value. Thus, the frequency of execution of the routine of FIG. 3 is nominally a first frequency, such as once every 1-5 seconds. However, if the frame pending bit is set, the frequency of execution of the routine is increases to a second frequency, such as once every 0.1 seconds.

However, in embodiments where the multi-network device 100 is acting as a sleepy end node on multiple networks, the execution time of this routine may not be as important. For example, in a scenario where the multi-network device 100 is operating as a sleepy end device on multiple networks, the device may repeat steps 220-230 two or more times before exiting the routine. In other words, if the frame pending bit is set, the multi-network device 100 will continue to repeat step 230 until the frame pending bit is no longer set.

Additionally, the frequency with which the routine of FIG. 3 is executed affects the other networks of which the multi-network device 100 is a member. As stated above, in the case where the multi-network device is acting as a sleepy end device on multiple networks, the execution time of the routine in FIG. 3 is not critical. Furthermore, since the device is operating as a sleepy end device, its absence from other networks is not critical. In this embodiment, the multi-network device 100 may be configured so that it executed the routine of FIG. 3 for a first network, and then return to a low power state. After a predetermined interval, the multi-network device 100 is awakened and executes the routine for a second network. This process may continue until the multi-network device 100 has executed this routine for each network that it is a part of. It then repeats this process, starting again at the first network. This interval is implementation specific, and its value is not limited by the present disclosure.

In the scenario where the multi-network device 100 is the coordinator or router device for one network, the software may be configured differently. In this embodiment, the device 100 would be in its active state at all times, and would be, by default, a part of the network for which it is the coordinator or router device. At a predetermined interval, the multi-network device 100 would be interrupted to indicate that it should execute the routine of FIG. 3 for a network that it is a sleepy end device on. It then performs the routine of FIG. 3 and returns back to its default network. This routine can be done multiple times if the multi-network device 100 is a sleepy end device for multiple networks. Although the above description suggests that an interrupt is used to signal that the multi-device device 100 should execute the routine of FIG. 3, the disclosure is not limited to this embodiment. For example, other mechanisms may be used to determine when the multi-network device 100 operates as a sleepy end device, such as polling on timer.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of exemplary embodiments in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device, comprising:
   exactly one radio portion, wherein the radio portion comprises:
      an antenna;
      a radio circuit;
      protocol interfacing and processing circuitry; and
      one or more configuration registers;
   a processing unit; and
   a non-transitory computer readable medium, in communication with the processing unit, comprising instructions which, when executed, allow the device to share the radio portion among a first IEEE802.15.4 network and a second IEEE802.15.4 network by:

configuring the radio portion to operate as a parent node on the second IEEE802.15.4 network;

setting a timer to a predetermined value; and upon expiration of the timer, reconfiguring the radio portion to operate as a sleepy end device on the first IEEE802.15.4 network, wherein the device performs a function as a sleepy end device, and configuring the radio portion to operate on the second IEEE802.15.4 network after the function is performed, and wherein each time the timer expires, the radio portion is reconfigured to operate as a sleepy end device on the first IEEE802.15.4 network.

2. The device of claim 1, wherein the instructions, when executed by the device while operating as a sleepy end device:

poll a parent node of the first IEEE802.15.4 network; and retrieve a communication from the parent node of the first IEEE802.15.4 network if a communication is determined to be available based on the polling.

3. The device of claim 1, wherein the instructions, when executed by the device while operating as a sleepy end device:

transmit a first communication to a parent node of the first IEEE802.15.4 network.

4. The device of claim 3, wherein, after transmitting the first communication to the parent node, the instructions, when executed:

poll a parent node of the first IEEE802.15.4 network; and retrieve a second communication from the parent node of the first IEEE802.15.4 network if the second communication is determined to be available based on the polling.

5. The device of claim 2, wherein the communication from the parent node comprises a frame pending bit, and wherein the timer is set to a second predetermined value, smaller than the predetermined value, if the frame pending bit is set.

6. The device of claim 1, wherein the device operates as a coordinator node on the second IEEE802.15.4 network.

7. The device of claim 6, wherein said first IEEE802.15.4 network comprises a Zigbee SE network and said second IEEE802.15.4 network comprises a Zigbee HA network.

8. The device of claim 1, wherein a duration of time between the configuring of the radio portion to operate on the first network and the reconfiguring of the radio portion to operate on the second network is less than about 15 ms.

9. The device of claim 1, wherein the predetermined value is between 1 and 5 seconds.

10. A method of using a device to operate on two different IEEE802.15.4 networks, comprising:

configuring a radio portion of said device to operate as a parent node on a second IEEE802.15.4 network;

configuring said radio portion of said device to operate as a sleepy end device on a first IEEE802.15.4 network after an expiration of a timer;

polling a parent node of the first IEEE802.15.4 network;

retrieving a communication from the parent node of the first IEEE802.15.4 network if a communication is determined to be available based on the polling; and reconfiguring said radio portion of said device to operate on the second IEEE802.15.4 network after the polling and retrieving steps, wherein the radio portion comprises:

an antenna;

a radio circuit;

protocol interfacing and processing circuitry; and one or more configuration registers.

11. The method of claim 10, further comprising transmitting a communication to a parent node of the first IEEE802.15.4 network after said configuring step.

12. The method of claim 10, wherein the communication from the parent node comprises a frame pending bit, and wherein the timer is set to a smaller value if the frame pending bit is set.

13. The method of claim 10, wherein the device operates as a coordinator node on the second IEEE802.15.4 network.

14. A non-transitory computer readable medium comprising instructions allowing a device, having a radio portion, to operate as a parent node on a Zigbee HA network and as a sleepy end device on a Zigbee SE network, wherein, said instructions, when executed:

configure said radio portion of said device to operate as a parent node on the Zigbee HA network;

set a timer to a predetermined value;

configure said radio portion of said device to operate on the Zigbee SE network after expiration of the timer;

poll a parent node of the Zigbee SE network;

retrieve a communication from the parent node of the Zigbee SE network if a communication is determined to be available based on the polling; and reconfigure said radio portion of said device to operate as a parent node on the Zigbee HA network after the polling and retrieving steps, wherein the radio portion comprises:

an antenna;

a radio circuit;

protocol interfacing and processing circuitry; and one or more configuration registers.

15. The non-transitory computer readable medium of claim 14, wherein the instructions, when executed:

transmit a communication to a parent node of the Zigbee SE network after said configuring step.

16. The non-transitory computer readable medium of claim 14, wherein the communication from the parent node comprises a frame pending bit, and wherein the timer is set to a second predetermined value, smaller than the predetermined value, if the frame pending bit is set.

* * * * *